(12) United States Patent
Haddadin

(10) Patent No.: US 10,981,278 B2
(45) Date of Patent: Apr. 20, 2021

(54) ROBOT SYSTEM

(71) Applicant: KASTANIENBAUM GMBH, Munich (DE)

(72) Inventor: Sami Haddadin, Hannover (DE)

(73) Assignee: KASTANIENBAUM GMBH, Munich (DE)

(*) Notice: Subject to any disclaimer, the term of this patent is extended or adjusted under 35 U.S.C. 154(b) by 413 days.

(21) Appl. No.: 15/766,094

(22) PCT Filed: Oct. 10, 2016

(86) PCT No.: PCT/EP2016/074252
§ 371 (c)(1),
(2) Date: Aug. 8, 2018

(87) PCT Pub. No.: WO2017/060540
PCT Pub. Date: Apr. 13, 2017

(65) Prior Publication Data
US 2018/0354141 A1 Dec. 13, 2018

(30) Foreign Application Priority Data
Oct. 8, 2015 (DE) .......................... 102015012961.9

(51) Int. Cl.
*B25J 13/06* (2006.01)
*G05B 19/409* (2006.01)
(Continued)

(52) U.S. Cl.
CPC ............. *B25J 13/06* (2013.01); *B25J 9/0081* (2013.01); *B25J 9/1656* (2013.01); *B25J 9/1664* (2013.01);
(Continued)

(58) Field of Classification Search
CPC ..... A61B 17/1285; A61B 34/25; A61B 34/30; A61B 2017/2945; A61B 18/1206;
(Continued)

(56) References Cited

U.S. PATENT DOCUMENTS

| 4,804,304 A | 2/1989 | Tellden et al. |
| 8,423,189 B2 | 4/2013 | Nakanishi et al. |

(Continued)

FOREIGN PATENT DOCUMENTS

| AT | 509927 A2 | 12/2011 |
| CN | 201437046 U | 4/2010 |

(Continued)

OTHER PUBLICATIONS

Rokossa, Efficient robot programming with knowledge-integrated functional modules, 2013, IEEE, p. 4109-4113 (Year: 2013).*
(Continued)

*Primary Examiner* — McDieunel Marc
(74) *Attorney, Agent, or Firm* — Dilworth IP, LLC

(57) ABSTRACT

A robot system including at least one robot arm and a control unit which is designed such that it can pre-set at least one pre-defined operation carried out by the robot system. The robot system also includes a display device and at least one input device applied to the robot arm, which is designed such that the sequence of operations of the robot system is set and/or the pre-defined operations of the robot system is parameterized by means of the input device, and which is also designed such that it allows the user to control, on a graphic user interface, represented by the control unit on the display device, the setting of the pre-defined operations of the robot system, the setting of the sequence of operations and/or the parameterization of the pre-defined operations for the robot system.

24 Claims, 3 Drawing Sheets

Figure 1:
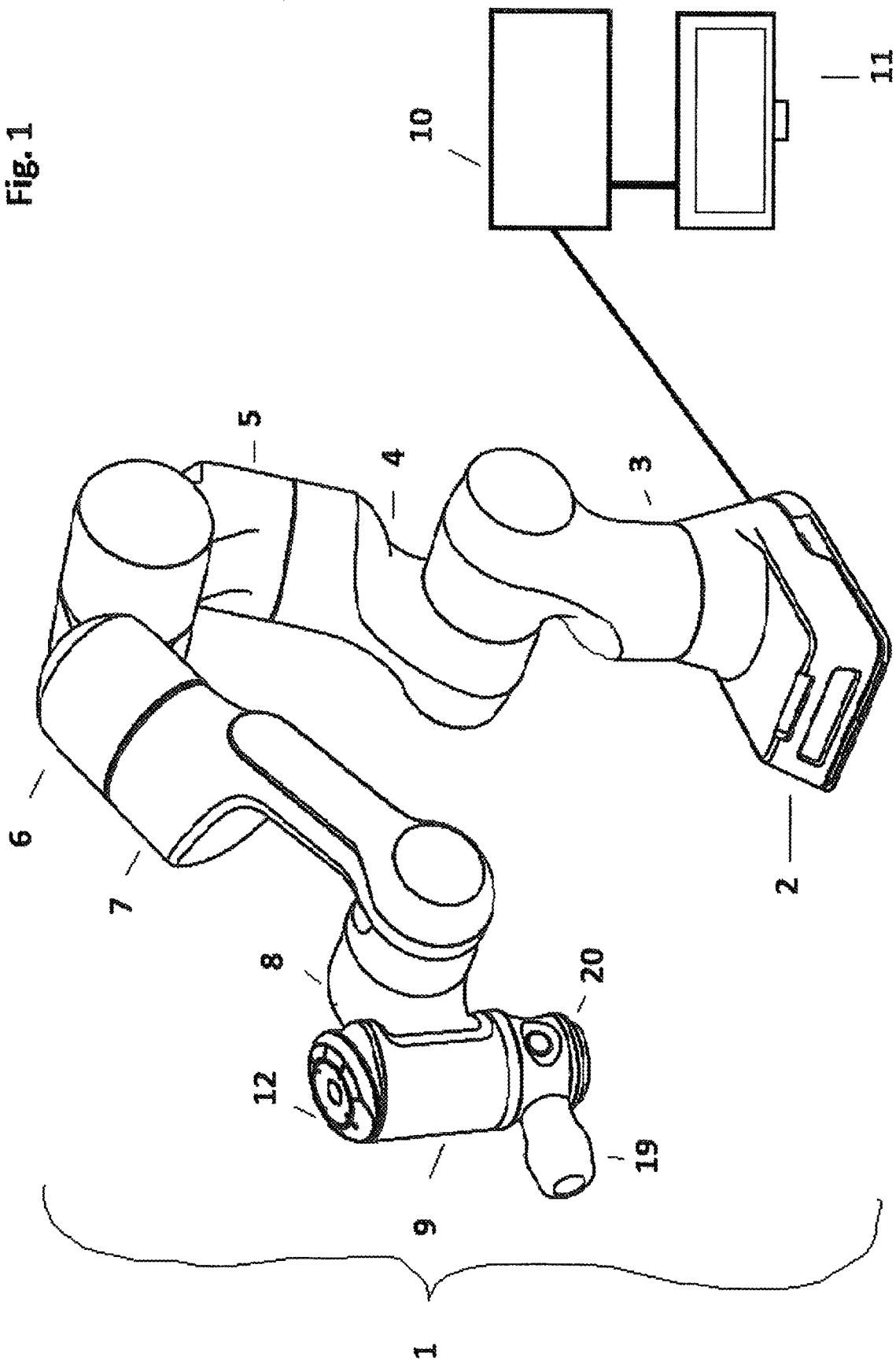

(51) Int. Cl.
*G05B 19/425* (2006.01)
*B25J 9/16* (2006.01)
*B25J 9/00* (2006.01)
*B25J 11/00* (2006.01)

(52) U.S. Cl.
CPC ........... *B25J 11/005* (2013.01); *G05B 19/409* (2013.01); *G05B 19/425* (2013.01); *G05B 2219/33034* (2013.01); *G05B 2219/36162* (2013.01); *G05B 2219/39427* (2013.01); *G05B 2219/40099* (2013.01); *G05B 2219/40392* (2013.01); *G05B 2219/40395* (2013.01)

(58) Field of Classification Search
CPC ........ A61B 18/1445; A61B 2018/0063; A61B 2018/00922; A61B 2018/126; A61B 2034/742; A61B 34/35; A61B 34/37; A61B 34/74; A61B 1/00039; A61B 1/00142; A61B 1/0016; A61B 1/0052; A61B 1/04; A61B 2017/00314; A61B 2017/00327; A61B 2017/00438; A61B 2034/105; A61B 2034/2051; A61B 2034/2059; A61B 2034/2061; A61B 2034/2065; A61B 2034/301; A61B 2034/306; A61B 2090/3614; A61B 2090/371; A61B 2090/3735; A61B 2090/374; A61B 2090/3762; A61B 2090/378; A61B 2562/0266; A61B 34/20; A61B 46/10; A61B 5/11; B25J 9/1697; B25J 11/0045; B25J 9/1664; B25J 9/1669; G05B 2219/36418; G05B 2219/36425; G05D 1/005; G05D 1/0088; G16H 40/63; H04N 5/272; A61M 25/0111; A61M 25/0113; G06F 2203/0339; G06F 3/0346; G06F 3/03547; G06F 3/03549; G06F 3/04847
See application file for complete search history.

(56) References Cited

U.S. PATENT DOCUMENTS

| | | | |
|---|---|---|---|
| 2004/0267404 A1* | 12/2004 | Danko | E02F 3/438 700/245 |
| 2005/0166413 A1* | 8/2005 | Crampton | B25J 13/088 33/503 |
| 2008/0016979 A1 | 1/2008 | Yasumura et al. | |
| 2008/0114428 A1* | 5/2008 | Trembly | A61B 18/1815 607/100 |
| 2009/0314120 A1 | 12/2009 | Larsson et al. | |
| 2011/0126130 A1* | 5/2011 | Lieb | G06F 3/1454 715/753 |
| 2013/0151010 A1* | 6/2013 | Kubota | B25J 13/06 700/264 |
| 2013/0255426 A1* | 10/2013 | Kassow | B25J 18/00 74/490.03 |
| 2013/0273818 A1 | 10/2013 | Guan et al. | |
| 2015/0193949 A1* | 7/2015 | Katz | G06T 7/74 345/8 |
| 2017/0348854 A1* | 12/2017 | Oleynik | A47J 47/02 |
| 2018/0117767 A1* | 5/2018 | Yokota | B25J 9/0018 |
| 2018/0235719 A1* | 8/2018 | Jarc | A61B 34/37 |
| 2018/0345505 A1* | 12/2018 | Haddadin | B25J 13/06 |
| 2019/0125459 A1* | 5/2019 | Shelton, IV | A61B 17/0206 |
| 2019/0200977 A1* | 7/2019 | Shelton, IV | A61B 17/02 |

FOREIGN PATENT DOCUMENTS

| | | |
|---|---|---|
| CN | 102302858 A | 1/2012 |
| CN | 102410342 A | 4/2012 |
| CN | 104802156 A | 7/2015 |
| DE | 199 56 176 A1 | 10/2001 |
| DE | 699 21 721 A1 | 11/2005 |
| DE | 10 2005 054575 B3 | 4/2007 |
| DE | 10 2008 062622 A1 | 6/2010 |
| DE | 10 2010 063222 A1 | 6/2012 |
| DE | 10 2013 013679 A1 | 2/2014 |
| DE | 10 2013 109753 A1 | 3/2014 |
| DE | 10 2014 216514 B3 | 9/2015 |
| EP | 1435737 A1 | 7/2004 |
| EP | 1880809 A1 | 1/2008 |
| EP | 2129498 A1 | 12/2009 |
| EP | 2131257 A1 | 12/2009 |
| EP | 2851162 A2 | 3/2015 |
| EP | 2864085 A2 | 4/2015 |
| JP | H08281580 A | 10/1996 |
| JP | 2008-23642 A | 2/2008 |
| WO | WO 2009/124904 A1 | 10/2009 |
| WO | WO 2011/107143 A1 | 9/2011 |
| WO | WO 2014/162161 A1 | 10/2014 |
| WO | WO 2015/113757 A1 | 8/2015 |

OTHER PUBLICATIONS

Bannat et al., Artificial Cognition in Production Systems, 2010, IEEE, p. 418-174 (Year: 2010).*
Dreyer et al., Man-machine-interface for intuitive programming of industrial robots, 2012, IEEE, p. 2128-2133 (Year: 2012).*
Grigorescu et al., Model driven developed machine vision system for service robotics, 2010, IEEE, p. 877-883 (Year: 2010).*
U.S. Appl. No. 15/752,574, filed Feb. 13, 2018, Haddadin et al.
U.S. Appl. No. 15/766,080, filed Apr. 5, 2018, Haddadin.
U.S. Appl. No. 15/766,083, filed Apr. 5, 2018, Haddadin.
PCT/EP2016/069339, dated Oct. 17, 2016, International Search Report and Written Opinion.
PCT/EP2016/069339, dated Feb. 20, 2018, International Preliminary Report on Patentability.
PCT/EP2016/074250, dated Jan. 30, 2017, International Search Report and Written Opinion.
PCT/EP2016/074251, dated Feb. 2, 2017, International Search Report and Written Opinion.
PCT/EP2016/074252, dated Feb. 2, 2017 International Search Report and Written Opinion.
AT 509927 is understood by its English-language abstract and figures.
CN 201437046 is understood by its English-language machine translation and figures.
CN 102302858 is understood by its English-language machine translation and figures.
CN 102410342 is understood by its English-language machine translation and figures.
CN 104802156 is understood by its English-language machine translation and figures.
DE 199 56 176 is understood by its English-language machine translation and figures.
DE 699 21 721 is understood by its English-language abstract and figures.
DE 10 2005 054575 is understood by its English-language abstract and figures.
DE 10 2008 062622 is understood by its English-language abstract and figures.
DE 10 2010 063222 is understood by its English-language abstract and figures.
DE 10 2013 013679 is understood by its English-language abstract and figures.
DE 10 2013 109753 is understood by its English-language abstract and figures.
DE 10 2014 216514 is understood by its English-language machine translation and figures.
EP 2131257 is understood by its English-language abstract and figures.
EP 2851162 is understood by its English-language abstract and figures.
JP H08281580 is understood by its English-language abstract and figures.

(56) References Cited

OTHER PUBLICATIONS

JP 2008-23642 is understood by its English-language machine translation and figures.
WO 2009/124904 is understood by its English-language abstract and figures.
WO 2015/113757 is understood by its English-language abstract and figures.

* cited by examiner

ROBOT SYSTEM

RELATED APPLICATIONS

This application is a national stage filing under 35 U.S.C. § 371 of International Patent Application Serial No. PCT/EP2016/074252, filed Oct. 10, 2016, entitled "Robot System," which claims priority to German application serial number 10 2015 012 961.9, filed Oct. 8, 2015. The entire contents of these applications are incorporated herein by reference in their entirety.

The invention relates to a robotic system with at least one robotic arm, at the end of which, for the operation of the robotic system, an effector may be mounted, which e.g. can consist of a tool.

Robots have now become established in many areas of industry and are e.g. used in the automotive industry for mounting, gluing, screwing, cutting, welding, painting or lifting heavy objects.

In order to teach a robotic system the desired operations, the robotic system must be programmed. This can be done with an on-line or off-line method, whereby in the off-line method the robot program is created without using the robot.

In on-line programming, the robot is needed for programming, which e.g. is the case with direct teach-in programming. Here, the individual points of the desired trajectories are approached by directly guiding the effector by an operator and the respective position of the effector, e.g. of a gripping tool, is determined via the internal encoders and stored. After the geometry of the trajectory has been programmed in this way, the trajectory program can be supplemented with additional instructions entered via an external handheld programming user device.

The previous methods of the described on-line programming are time consuming and uncomfortable for the operator.

It is therefore an object of the present invention to provide a robotic system in which the programming of the robotic system can be performed faster and easier as compared to previous systems.

This object is achieved by a robotic system as indicated in claim 1.

Advantageous embodiments of the invention are specified in the dependent claims 2 to 26.

Figure 2:
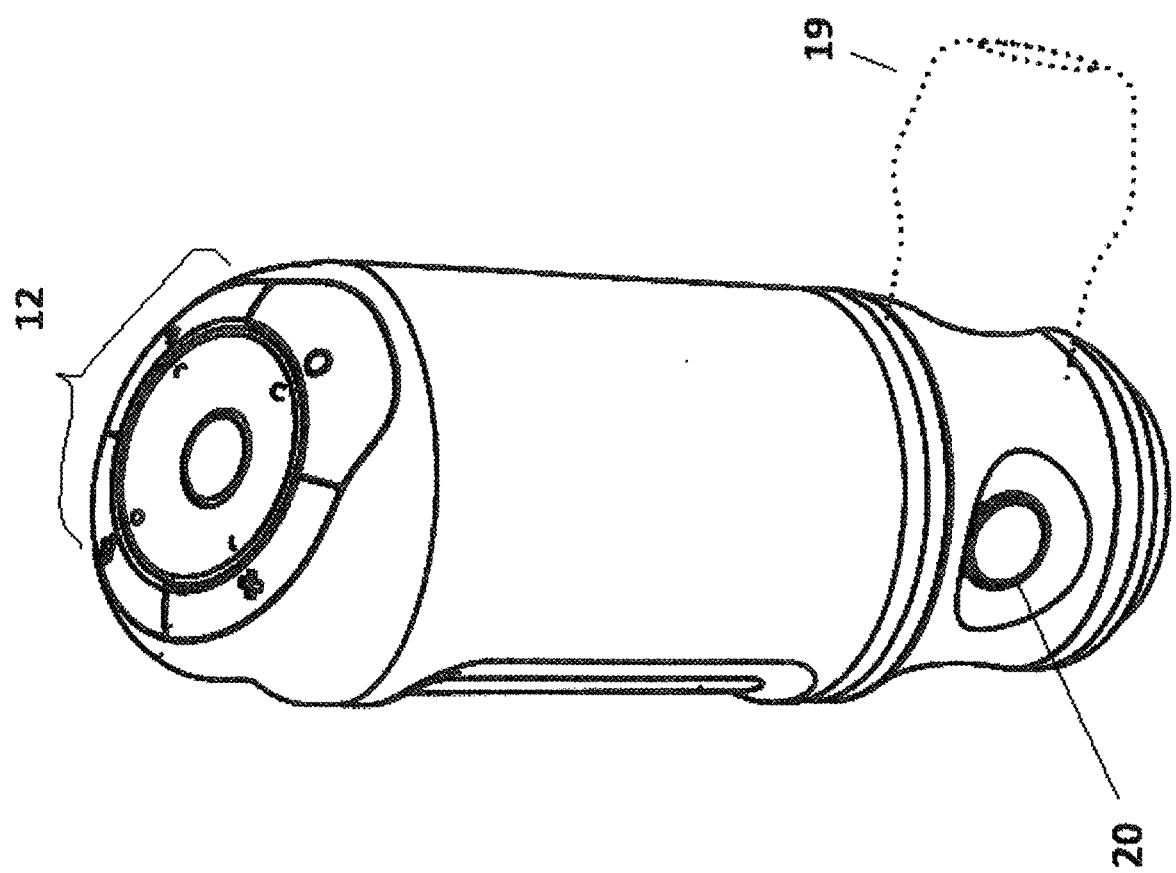
Figure 3:
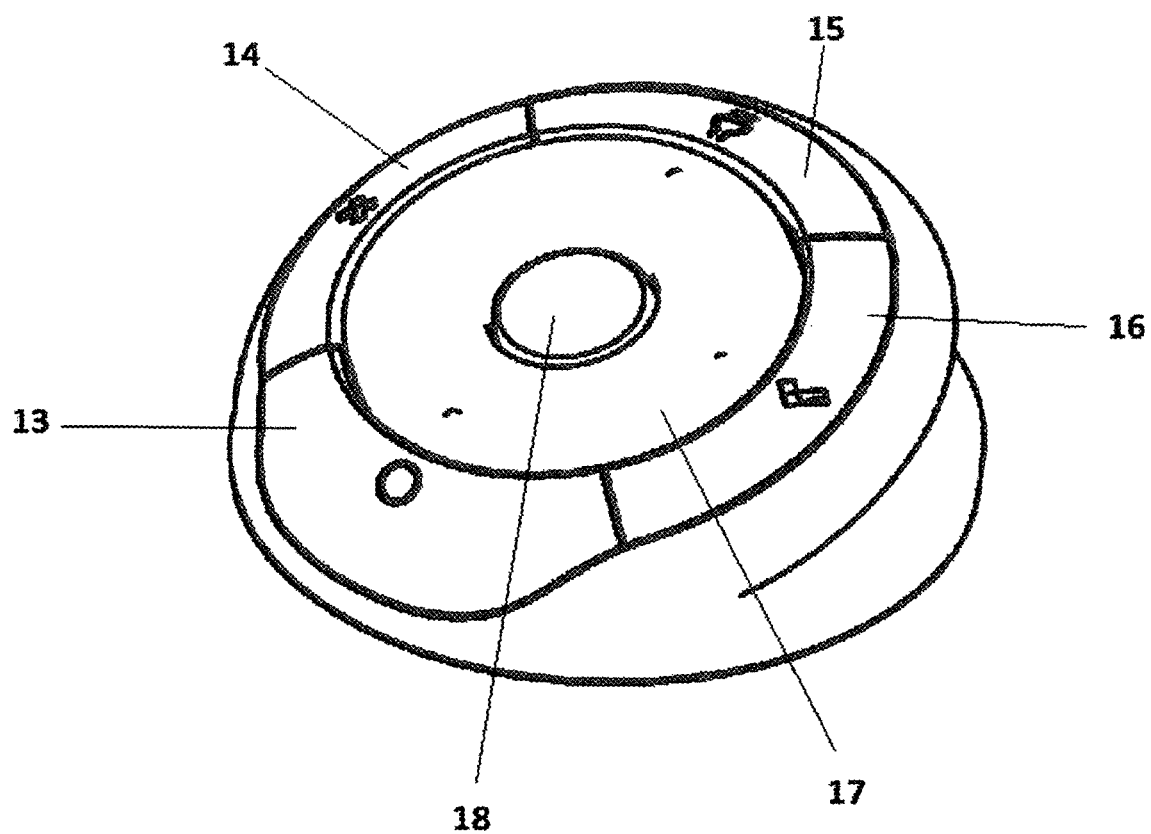

Embodiments of the invention will be explained with reference to the accompanying drawings, in which FIG. 1 shows a robot according to an embodiment of the robotic system according to the invention;

FIG. 2 shows a distal robotic arm member of the robotic arm of the robot system according to the invention, called as pilot head, which is used in connection with an embodiment of the robotic system according to the invention; and FIG. 3 shows a part of an input device which is used in connection with a preferred embodiment of the robotic system according to the invention.

FIG. 1 shows a robotic system according to the invention comprising a robot 1 which stands on a robot basis 2 which carries a robotic arm (or manipulator) which consists of seven robotic arm members 3, 4, 5, 6, 7, 8 and 9 which are linked by means of motion axes (joints). The last (distal) robotic arm member 9, which is also referred to hereinafter as a pilot head, is designed so that in the lower part of the pilot head (not shown in FIG. 1) an effector can be attached thereto, which effector can cause any interaction of the robot with the environment.

Effectors used in connection with the robotic system according to the invention may e.g. be tools for workpiece machining, e.g. a drill, gripper systems for handling and manipulating objects, measuring equipment for carrying out test jobs or cameras, with which the robot can perform observations.

The robot 1 is connected to a computer 10, which takes over the control of the robot 1 and is connected to a display device 11, on which a graphical user interface for programming the robot can be displayed and which, e.g. can consist of a computer screen or the screen of a laptop. The computer 10 is hereinafter also referred to as a control unit.

The pilot head 9 of the robotic system, which is shown in FIG. 2 in a larger dimension, comprises in the upper part a key panel 12, which is also shown in a larger dimension in FIG. 3. The key panel as shown in FIG. 3 has four operating keys 13, 14, 15 and 16 in the form of short-stroke keys, which can be defined or occupied with various functions which must often be called up by the operator in the course of programming and/or parameterizing the robotic system, e.g. delete, save or set, and which are marked with appropriate symbols.

The four operating keys 13, 14, 15 and 16 encircle a D-pad short-stroke key 17, which can be tilted up, down, left and right, e.g. to control a cursor or a selection in a menu displayed on the graphical user interface of the display device in the directions up, down, left and right. In summary, the keys of the key panel 12 attached to the robotic arm and the key 20 constitute an input device.

Instead of a D-pad short-stroke key, other direction keys can also be used for cursor control, e.g. four mutually isolated keys for each of the directions up, down, left and right.

In the center of the D-pad short-stroke key 17, a transparent luminous surface 18 is arranged, which can be illuminated by lighting elements, e.g. one or more LEDs that can be activated by the control unit, in one color or different colors.

In addition, in the lower part of the pilot head 9, a handle 19 is attached, with which the pilot head can be easily guided by an operator of the robotic system.

Further, located in the lower part of the pilot head 9, another button or key 20 is provided, which is mounted on the pilot head such that it can be operated by the operator of the robotic system with the same hand, which hand guides the pilot head 9 or the handle 19 of the pilot head 9 and thus the robotic arm.

The control unit 10, which comprises hardware and software, is designed such that it can specify at least one predefined operation which can be carried out by the robotic system, wherein this operation includes the corresponding control commands with which the axes and the drive of the robot are regulated and the sensors (not shown in FIG. 1) of the robot are controlled.

Preferably, a plurality of predefined operations and the associated commands are stored in the control unit. These predefined operations could include, e.g. picking up objects, placing objects, inserting objects, screwing in objects, drilling, surface finishing or button/key actuating.

In the control unit the predefined operations are assigned to icons that can be presented on a graphical user interface, which can be displayed on the display device by means of the control unit.

In a preferred embodiment of the robotic system according to the invention, the operator can use the keys 13, 14, 15, 16 and 17 of the input device to select the desired operations, that the robotic system should perform to accomplish a given task, from a menu displayed on the graphical user interface, in that the operator moves e.g. by means of the D-pad short-stroke key, in the menu to the corresponding operation icon and then, after having selected this icon, confirming this icon by pressing one of the four operating keys 13, 14, 15 and 16, which keys have been previously set with a corresponding function.

In an alternative embodiment, key 20 may also be used to confirm an operation previously selected by means of the D-pad stroke key.

Alternatively, by moving the icons representing the operations by means of the D-pad short-stroke key, the operator can also change the logical order of the operations with which the robotic system should perform the work process.

In a further embodiment, the robotic system according to the invention can also be designed in such a way that the control unit is designed to, for each operation, display in the graphical user interface during the parameterization of an operation a predetermined parameterization submenu (context menu) stored in the control unit, in which submenu the various predetermined parameterization options are shown, which can then be selected with the input device on the pilot head 9 via the keys 13, 14, 15, 16, 17 and/or 20 by means of a control of the graphical user interface of the parameterization submenu in order to perform a parameterization.

With such a parameterization, e.g. parameters such as the coordinates of points to be approached by the effector, torques, forces, accelerations, time durations, number of repetitions or subsequent operations of an operation can be entered by means of the input device.

In a further embodiment, the control unit stores all possible operations of the robotic system and all possible parameterization submenus aimed for these operations, which are structured such that the operator can conduct all programming of the robotic system at the input device with a very limited number of input elements, e.g. keys, so that the programming can be done without the aid of external input devices such as computer keyboards. Ideally, with the pilot head as shown in FIG. 1, this can even be done with only one hand, so that the operator's second hand is free to be used for other functions, e.g. the actuation of an EMERGENCY STOP switch.

The input device attached to the pilot head does not necessarily have to consist of keys, but may e.g. also include a touchpad, a trackball, a joystick or similar device.

In the robotic system according to the invention, the input device is further adapted to provide a user-directed feedback to an operator of the robotic system while setting the sequence of operations of the robotic system and/or parameterizing the predefined operations for the robotic system.

Such feedback may be provided e.g. optically, in that static or varying light signals are emitted through the light field 18, which are triggered by the control unit.

In another embodiment, the feedback may be designed such that it can be detected haptically by the operator of the robot system. This can be performed e.g. by vibrating the input device, i.e. the pilot head 9, which is triggered by the control unit, in that a drive belonging to the pilot head is activated, accordingly.

According to a further embodiment, the keypad can also have a plurality of light fields by means of which the optical feedback occurs.

The feedback signals are preferably designed so that they confirm an input of the operator as being positive or negative. For example, in the event of a faulty input by the operator, the illuminated field 18 lights up red, while it lights up green when the input is correct.

In another embodiment, the feedback may also be arranged to represent a request to select a predefined operation of the robotic system from a group of predefined operations or to input a parameter with respect to an operation.

According to a further embodiment, the control unit may be configured such that a certain selection of operations and/or parameters is performed by actuating certain keys and/or specific key combinations on the input device.

Further, according to another embodiment, the control unit of the robotic system may be configured to display a graphical user interface on a display device on which the predefined operation can be displayed, wherein the control unit is further configured to provide feedback to the operator depending on the operation represented on the graphical user interface.

In a further embodiment of the robotic system according to the invention, the feedback can also be effected by an acoustic signal. For this, e.g., a speaker can be mounted directly on the input device, which is controlled by the control unit.

The display device of the robotic system may also consist of a 3D display device, e.g. electronic 3D glasses.

The invention claimed is:

1. Robotic system having at least one robotic arm, a control unit adapted to preselect at least one predefined operation to be performed by the robotic system, a display device and at least one input device attached to the robotic arm, said input device being configured to set via the input device the sequence of operations of the robotic system and/or to parameterize predefined operations of the robotic system and being further adapted to enable control on a graphical user interface, which is represented by the control unit on the display device, by a user as part of a setting of the predefined operations of the robotic system, of the setting of the sequence of operations and/or of the parameterization of the predefined operations for the robotic system;

wherein the robotic arm consists of a plurality of arm members, the input device being mounted on the arm member to which an effector is attachable;

wherein the input device is arranged so that the user, while guiding the arm member to which the effector is attachable with a hand of the user, can operate the input device simultaneously with the same hand; and wherein the input device includes a multi-key keypad having keys defined with various functions which must often be called up by the user in the course of programming and/or parameterizing the robotic system.

2. Robotic system according to claim 1, in which the keypad comprises one or more directional keys with which a cursor or a selection in a menu displayed on the graphical user interface in the directions up, down, left and right can be controlled.

3. Robotic system according to claim 1, in which the input device consists of a touchpad, a touch display, a trackball or a joystick.

4. Robotic system according to claim 1, in which the operations comprise one or more of the operations from the group including picking objects, placing objects, inserting objects, screwing objects, drilling, machining surfaces or actuating keys.

5. Robotic system according to claim 1, in which the control unit is adapted to display on the graphical user interface during the parameterization of an operation a parameterization submenu for each operation, in which the various predetermined parameterization options are shown, which then can be selected with the input device via its two-dimensional control of the graphical user interface of the parameterization submenu in order to perform a parameterization.

6. Robotic system according to claim 1, in which the control unit is configured so that it displays a dialog menu on the graphical user interface during the parameterization, wherein each parameter query, which individually appears via the dialog menu, is made via the input device.

7. Robotic system according to claim 1, in which the parameters acquired in the course of the parameterization comprise parameters derived from the parameter group including the parameters coordinates of points to be approached by the effector, torques, forces, accelerations, time periods, number of repetitions or follow-up operations of an operation.

8. Robotic system according to claim 1, in which the input device is further adapted to provide a user-directed feedback to the operator of the robotic system when setting the execution of operations of the robotic system and/or parameterizing the predefined operations for the robotic system.

9. Robotic system according to claim 8, in which the feedback is optically.

10. Robotic system according to claim 9, in which the feedback is effected by static or varying light signals.

11. Robotic system according to claim 9, in which in addition the keypad has luminous fields, via which the optical feedback takes place.

12. Robotic system according to claim 9, in which the keys of the keypad are adapted to emit light signals.

13. Robotic system according to claim 8, in which the feedback is adapted to be haptically detectable by the operator of the robotic system.

14. Robotic system according to claim 13, in which the feedback consists of vibrating the input device.

15. Robotic system according to claim 8, in which the feedback is arranged to positively or negatively confirm an operator input, or to provide neutral feedback.

16. Robotic system according to claim 8, in which the feedback is adapted to represent a request to select a predefined operation of the robotic system from a group of predefined operations.

17. Robotic system according to claim 8, in which the feedback is adapted to represent a request to input a parameter of an operation.

18. Robotic system according to claim 8, in which the feedback is arranged to be an error message.

19. Robotic system according to claim 8, in which the control unit is adapted to display a graphical user interface on a display device on which the predefined operation can be presented, and the control unit is further configured to provide feedback to the operator depending on the operation represented on the graphical user interface.

20. Robotic system according to claim 8, in which the feedback is effected by an acoustic signal.

21. Robotic system according to claim 1, in which the control unit is configured to perform a certain selection of operations and/or parameters by operating certain keys and/or specific key combinations on the input device.

22. Robotic system according to claim 1, in which the input device is axially opposed to the effector.

23. Robotic system according to claim 1, in which the display device comprises a 3D display device.

24. Robotic system according to claim 23, in which the display device comprises 3D glasses.

* * * * *